(12) United States Patent
Lin

(10) Patent No.: US 8,205,774 B2
(45) Date of Patent: Jun. 26, 2012

(54) CONNECTING ASSEMBLY FOR SUPPORT FRAMES OF A BICYCLE SADDLE

(75) Inventor: Chong-Jiang Lin, Taichung County (TW)

(73) Assignee: Sunny Wheel Industrial Co., Ltd., Changhua County (TW)

( * ) Notice: Subject to any disclaimer, the term of this patent is extended or adjusted under 35 U.S.C. 154(b) by 479 days.

(21) Appl. No.: 12/502,123

(22) Filed: Jul. 13, 2009

(65) Prior Publication Data

US 2011/0006095 A1   Jan. 13, 2011

(51) Int. Cl.
   *B62J 9/00* (2006.01)
(52) U.S. Cl. ........ 224/427; 224/448; 224/547; 224/550; 269/6; 269/43
(58) Field of Classification Search .................. 224/427, 224/448–449, 547, 550; 248/316.7, 689, 248/513, 540, 217.2, 219.1, 227.4, 229.12, 248/340, 215, 307; 297/188.05, 188.06, 297/188.12, 188.2, 188.21; 269/3, 6, 43, 269/45, 71

See application file for complete search history.

(56) References Cited

U.S. PATENT DOCUMENTS

| 551,016 | A | * | 12/1895 | Ward | 403/390 |
| 600,364 | A | * | 3/1898 | Hill | 224/445 |
| 627,225 | A | * | 6/1899 | Eifler | 224/455 |
| 2,092,372 | A | * | 9/1937 | Goeller | 439/781 |
| 3,669,491 | A | * | 6/1972 | Weslock | 297/248 |
| 5,123,698 | A | * | 6/1992 | Hodges | 297/201 |
| 5,228,796 | A | * | 7/1993 | Kao | 403/84 |
| 5,573,163 | A | * | 11/1996 | Lee et al. | 224/427 |
| 5,669,536 | A | * | 9/1997 | Wang | 224/443 |
| 5,878,930 | A | * | 3/1999 | Schwimmer | 224/427 |
| 5,893,501 | A | * | 4/1999 | Schwimmer | 224/427 |
| 7,681,947 | B2 | * | 3/2010 | Ritchey | 297/215.14 |

* cited by examiner

*Primary Examiner* — Justin Larson
*Assistant Examiner* — John Cogill

(57) ABSTRACT

A connecting assembly for support frames of a bicycle saddle is fixed to the support frames under the saddle in a simple and stable way, the connecting assembly can also be used together with a connecting member which has one end engaged with the connecting assembly and the other end for clamping or carrying objects.

10 Claims, 5 Drawing Sheets

CONNECTING ASSEMBLY FOR SUPPORT FRAMES OF A BICYCLE SADDLE

BACKGROUND OF THE INVENTION

1. Field of the Invention

The present invention relates to a connecting assembly for support frames of a bicycle, and more particularly to a connecting assembly which can be positioned under the saddle and can carry objects, furthermore, the connecting assembly can also be adjusted in length to match different saddles.

2. Description of the Prior Art

Bicycling is one of the most popular recreations and sports activities, and has even become a daily transport means. Many people like traveling by bicycle not only for short travel but for long journey. Making a long journey by bicycle can make us get closer to nature, experiencing the travel in a more concrete and up-close manner, that's why bicycling has become one of the most popular recreations. However, bicycle is not like a motorbike or car that has a sufficient space to carry luggage, a bicycle traveler has to carry luggage on his back or fix it to the bicycle frame, so it will be very convenient for the user if the space on the bicycle can be efficiently utilized. The conventional way of carrying objects is to fix a bicycle basket to the front of the bicycle to carry objects or fix the objects to the rear rack of the bicycle. Yet another method is to fix a connecting assembly to the support frames under the bicycle saddle to carry objects, the connecting assembly comprises two clamping pieces which oppositely clamp against the support frames and are then fixed to the support frames by screws. To enhance the bonding strength between the two clamping pieces and the support frames, each of the clamping pieces is formed with a circular cavity for holding the support frames, and also because of the circular cavity, the connecting assembly will slide relative to the support frames, and as a result, the objects carried on the connecting assembly will also slide along with the connecting assembly, causing damage to the objects.

The present invention has arisen to mitigate and/or obviate the afore-described disadvantages.

SUMMARY OF THE INVENTION

The primary object of the present invention is to provide a connecting assembly for support frames of a bicycle which can be positioned under the saddle and can carry objects, furthermore, the connecting assembly can also be adjusted in length to match different saddles.

To achieve the above object, a connecting assembly in accordance with the present invention is fixed to two support frames of a bicycle and comprises: a clamping member and a hook member. The clamping member includes a first assembling section connected to a clamping section which is axially defined with a clamping slot for engaging with one of the support frames. The hook member includes a second assembling section connected to a hook portion, the second assembling section is fixed to the first assembling section, the hook portion is radially provided with a hook notch for engaging with the other of the two support frames. Through the engagement of the clamping slot of the clamping member and the hook notch of the hook member with the support frames, the connecting assembly of the present invention can be securely fixed to the support frames below the saddle.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
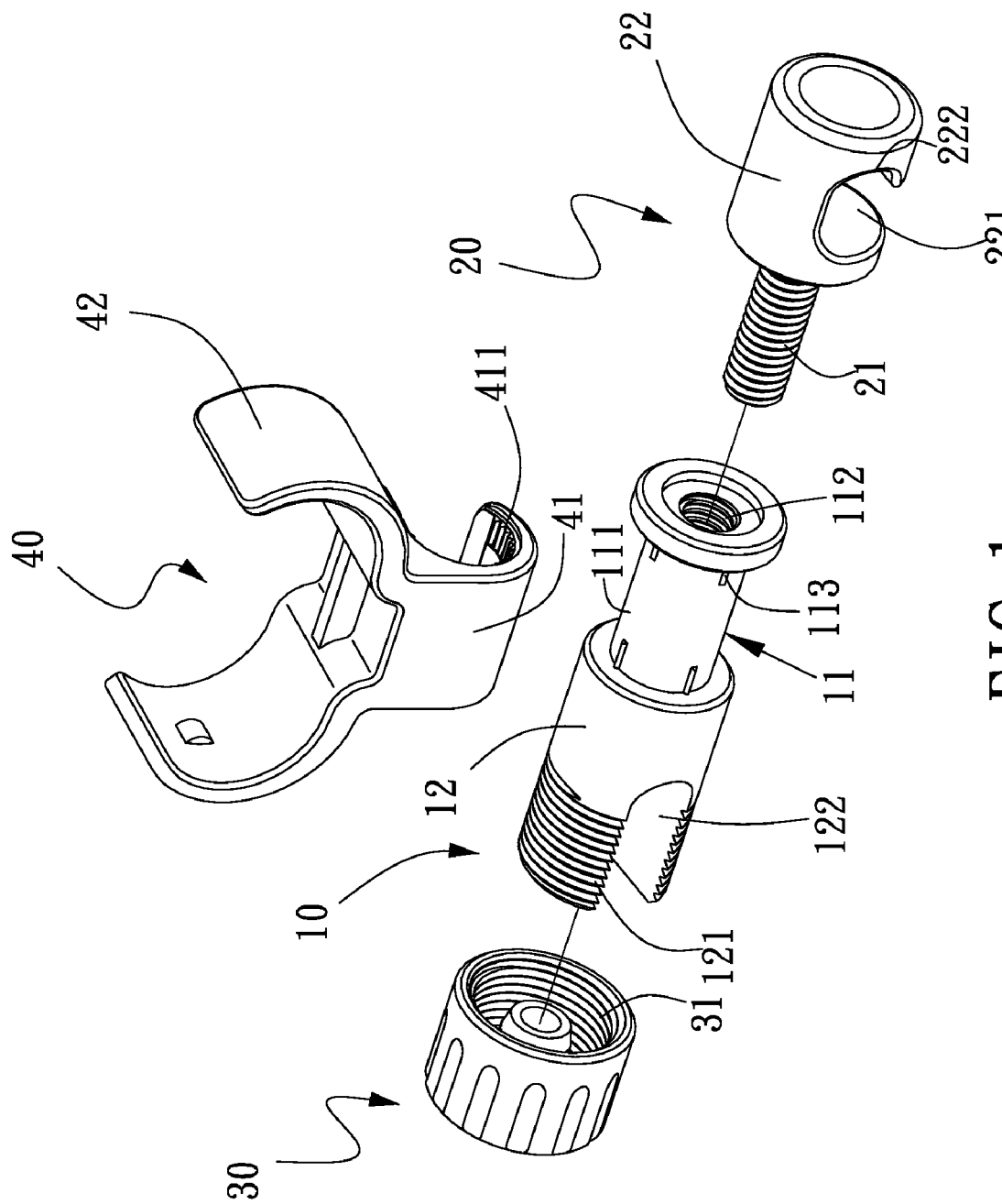
FIG. 1 is an exploded view of a connecting assembly for support frames of a bicycle saddle in accordance with the present invention.
Figure 2:
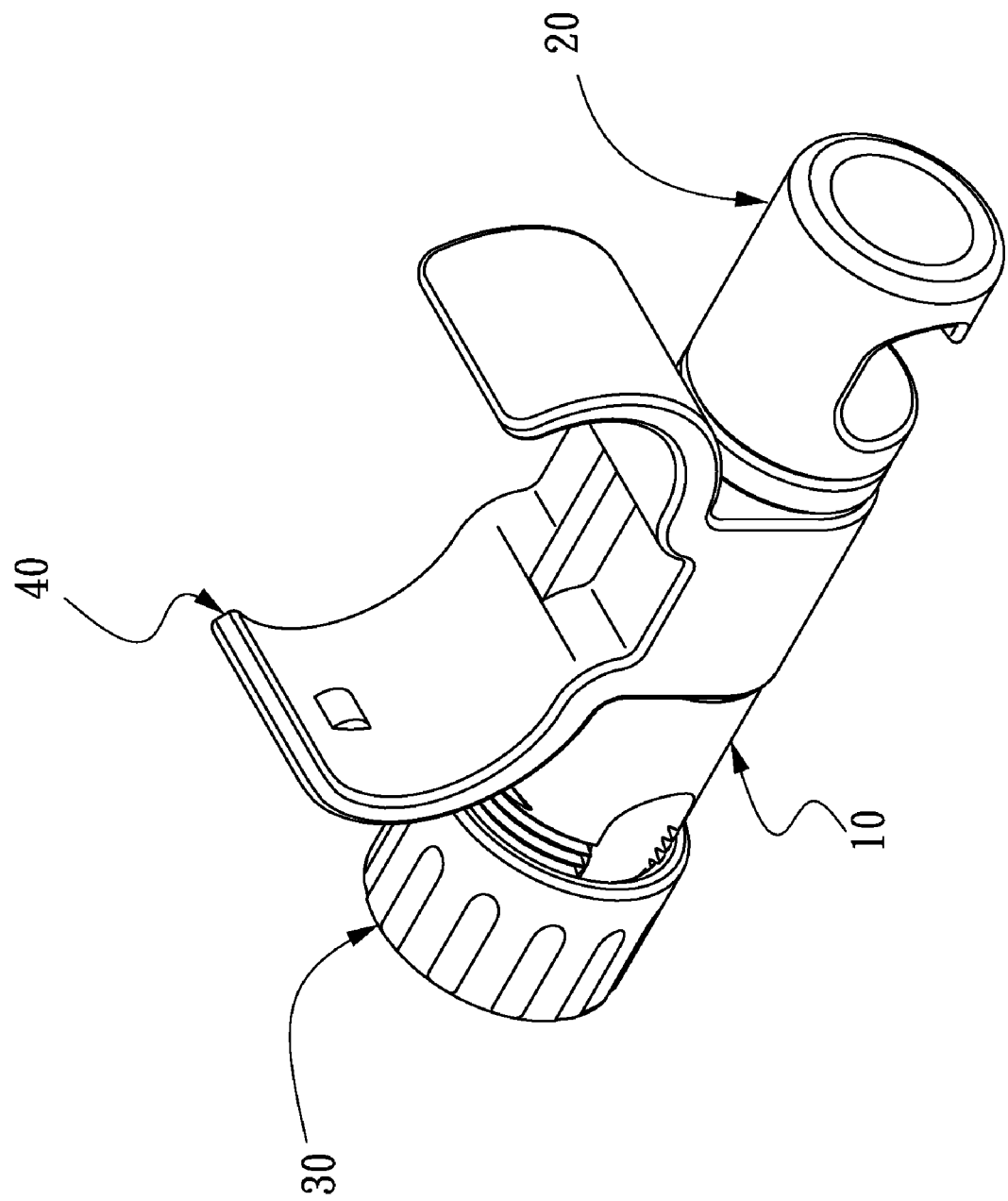
FIG. 2 is an assembly view of the connecting assembly for support frames of a bicycle saddle in accordance with the present invention.
Figure 3:
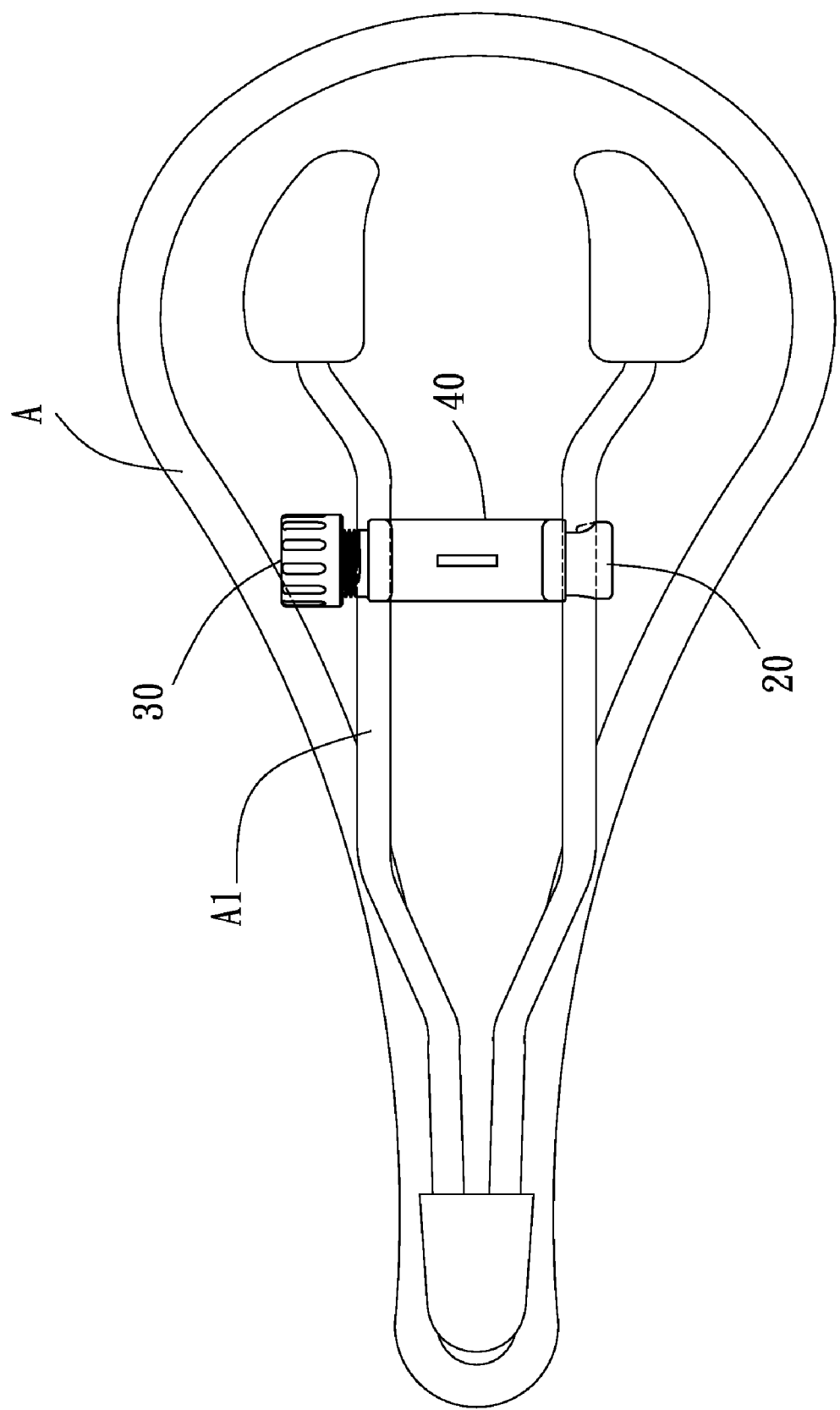
FIG. 3 shows that the connecting assembly for support frames of a bicycle saddle in accordance with the present invention is fixed to the support frames under the saddle.
Figure 4:
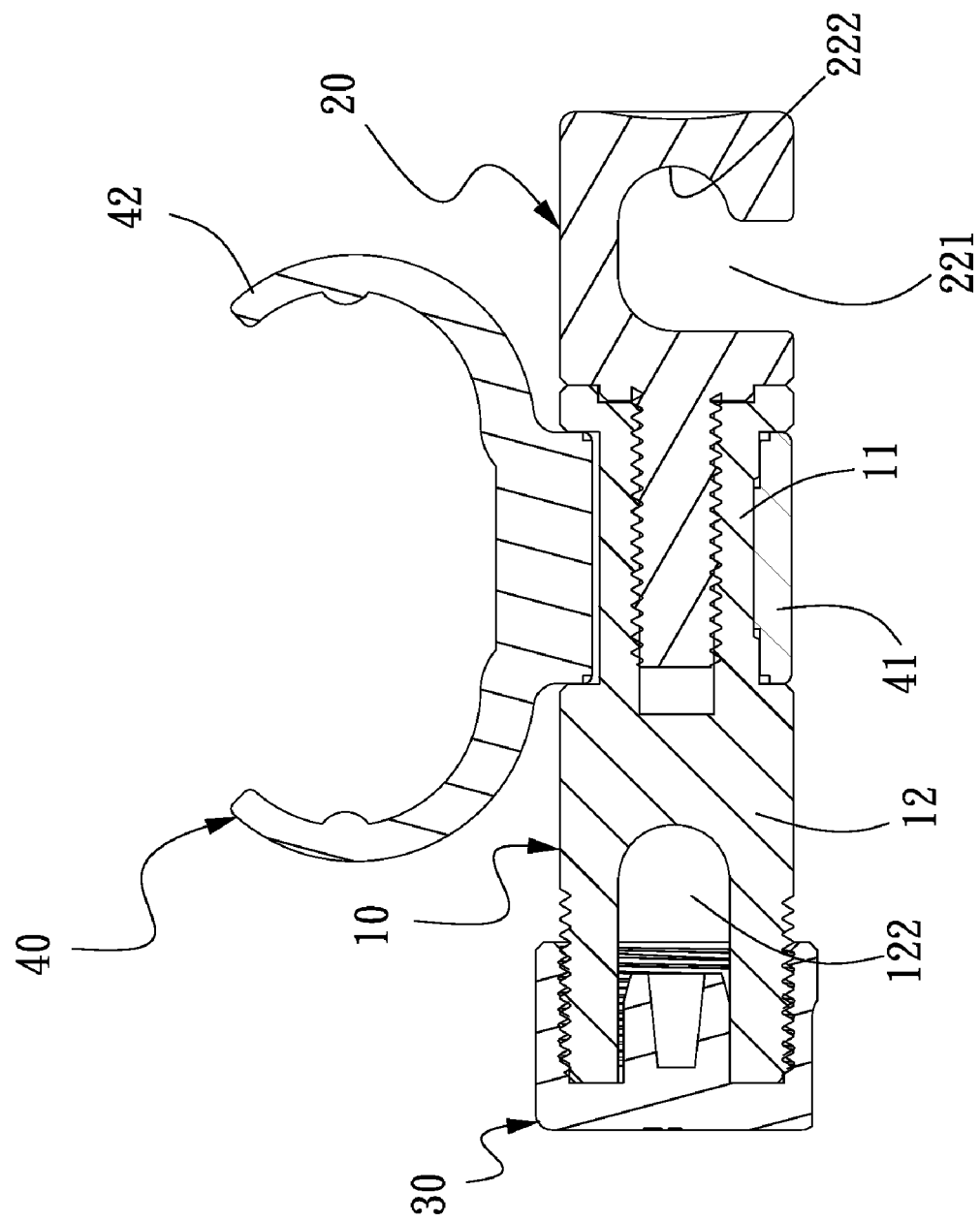
FIG. 4 is a cross sectional view of the connecting assembly for support frames of a bicycle saddle in accordance with the present invention.
Figure 5:
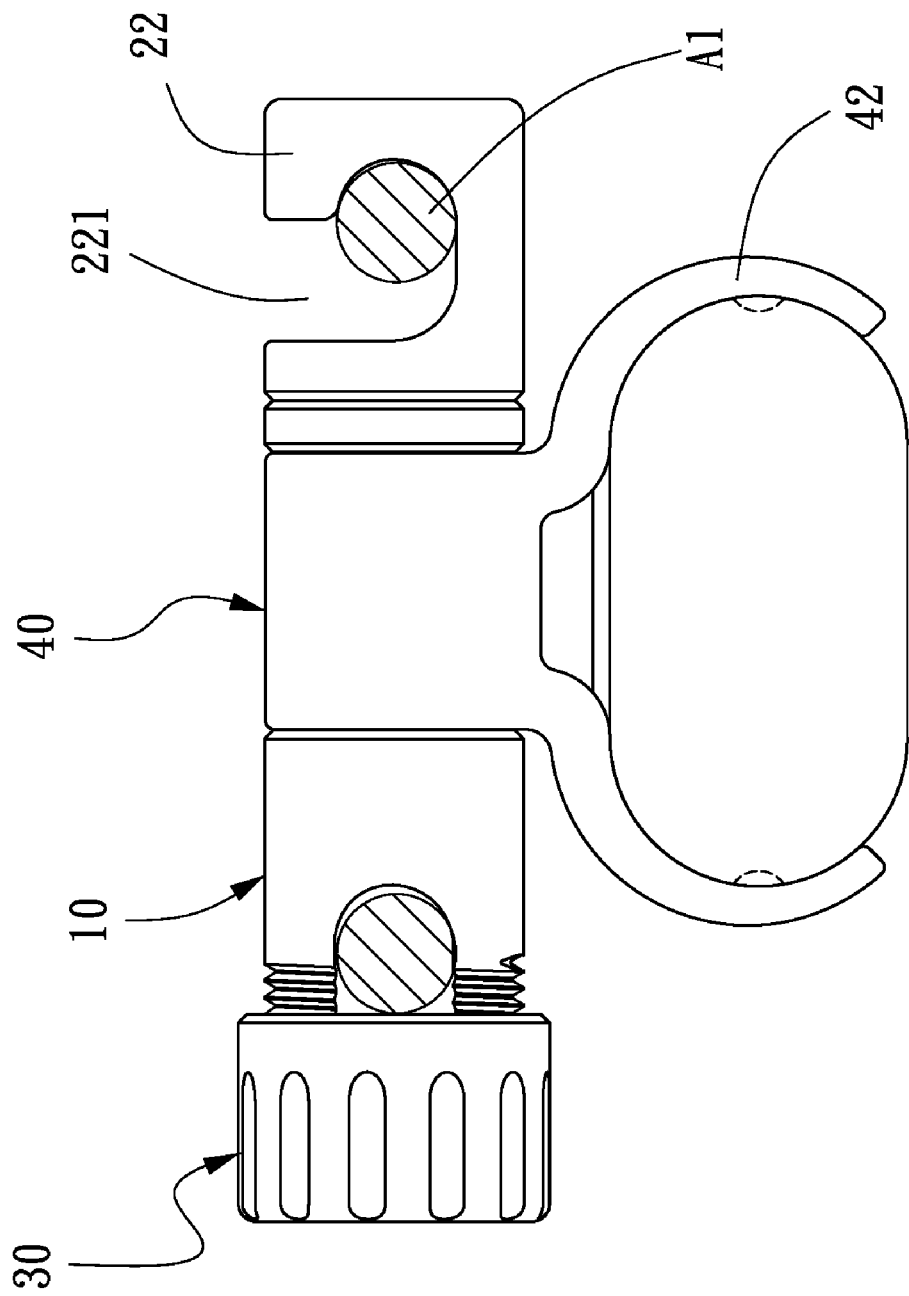
FIG. 5 is a front cross sectional view of the connecting assembly for support frames of a bicycle saddle in accordance with the present invention.

Referring to FIGS. 1-5, a connecting assembly for a bicycle saddle support in accordance with the present invention comprises: a clamping member 10, a hook member 20, and an end cap 30.

The clamping member 10 includes a first assembling section 11 connected to a clamping section 12. The first assembling section 11 is a hollow cylinder and is provided in its outer surface with an annular groove 111 in which are formed a plurality of ribs 113. On the inner surface of the first assembling section 11 is formed an inner thread 112. The clamping section 12 is cylindrical-shaped and provided on its outer surface with an outer thread 121, and the clamping section 12 is further axially defined with a clamping slot 122.

The hook member 20 includes a second assembling section 21 connected to a hook portion 22. The second assembling section 21 is provided with an outer thread for engaging with the inner thread 112 of the first assembling section 11, so that the second assembling section 21 is screwed in the first assembling section 11. The hook portion 22 is radially provided with a curved hook notch 221 and a restricting portion 222 formed at a far side of the hook notch 221 with respect to the second assembling section 21.

The end cap 30 is provided with an inner thread 31 for engaging with the outer thread 121 of the clamping section 12 of the clamping member 10, so that the end cap 30 is screwed on the clamping section 12 of the clamping member 10 to close the clamping slot 122.

To assemble the connecting assembly below the saddle A of a bicycle, the second assembling section 21 of the hook member 20 should be screwed in the first assembling section 11 of the clamping member 10. There are two support frames A1 (a first and a second support frames) under the saddle A, the clamping slot 122 of the clamping section 12 of the clamping member 10 can be inserted on the first support frame A1, so that the first support frame A1 is engaged in the clamping slot 122 of the clamping section 12, and the clamping member 10 is disposed between the two support frames A1. After the clamping section 12 of the clamping member 10 is engaged on the first support frame A1, the hook notch 221 of the hook member 20 screwed in the first assembling section 11 of the clamping member 10 is right aligned with the second support frame A1, so that the second support frame A1 can be engaged in the hook notch 221 of the hook member 20. Since the distance between the two support frames A1 may vary from saddle to saddle, after the clamping section 12 of the clamping member 10 clamped on the first support frame A1, the distance between the clamping slot 122 of the clamping member 10 and the hook notch 221 of the hook member 20 can be adjusted by adjusting the depth of the second assembling section 21 of the hook member 20 into the clamping member 10, so as to match the distance between the two support frames A1 of different saddles A. When the hook member 20 is hooked on the second support frame A1, since the direction of the clamping slot 122 is different from that of the hook notch 221, the clamping slot 122 and the hook notch 221 can prevent the disengagement of the support frames A1. After that, the end cap 30 can be screwed to the clamping section 12 of the clamping member 10 to prevent the disengagement of the first support frame A1 out of the clamping slot 122. By tightening the end cap 30 with respect to the clamping member 10, the clamping member 10 and the hook member 20 will be pulled toward the end cap 30, such that the support frames A1 will also move toward the bottom of the clamping slot 122 and the hook notch 221 and toward the restricting portion 222. The closer the support frames A1 are to the bottom of the clamping slot 122 and the hook notch 221 and the restricting portion 222, the lesser possibility that the support frames A1 could disengage therefrom. Furthermore, when the second support frame A1 moves towards the restricting portion 222 of the hook notch 221, since the hook notch 221 has a curved angle, the second support frame A1 will move through the curved angle and then into the restricting portion 222 of the hook notch 221, so that the curved angle can prevent the disengagement of the second support frame A1. Therefore, when the end cap 30 is tightened, the connecting assembly of the present invention will be securely fixed to the support frames A1 below the saddle A.

When it is positioned under the saddle A, the connecting assembly of the present invention can further be used together with a connecting member 40 which includes a hook portion 41 and a clamping portion 42. The hook portion 41 is provided with a plurality of grooves 411 for engaging with the ribs 113 of the first assembling section 11 of the clamping member 10, so as to fix the connecting member 40 to the connecting assembly of the present invention in such a manner that the hook portion 41 is restricted in the annular groove 111 of the first assembling section 11 of the clamping member 10. The clamping portion 42 of the connecting member 40 is C-shaped, when the connecting assembly is positioned below the saddle A, and the connecting member 40 is fixed to the connecting assembly, the clamping portion 42 of the connecting member 40 can be used to clamp some objects or receptacles, so that the space below the saddle A can be efficiently utilized carry some objects.

While we have shown and described various embodiments in accordance with the present invention, it is clear to those skilled in the art that further embodiments may be made without departing from the scope of the present invention.

What is claimed is:

1. A connecting assembly for support frames of a bicycle saddle being fixed to two support frames of a bicycle saddle and comprising:
   a clamping member with a clamping section, the clamping section being axially defined with a clamping slot for engaging with one of the support frames;
   a hook member including a hook portion, the hook portion being radially provided with a hook notch for engaging with the other of the two support frames, and the clamping slot and the hook notch being engaged with the two support frames in different directions;
   the clamping member further including a first assembling section connected to the clamping section, and the hook member further including a second assembling section connected to the hook portion, an inner thread being formed on an inner surface of the first assembling section, the second assembling section being provided with an outer thread for engaging with the inner thread of the first assembling section, so that the second assembling section is screwed in the first assembling section.

2. The connecting assembly for support frames of a bicycle saddle as claimed in claim 1 further comprising a connecting member which includes a hook portion and a clamping portion, the hook portion is provided with a plurality of grooves for engaging with a plurality of ribs formed on an outer surface of the first assembling section of the clamping member, so as to fix the connecting member to the first assembling section of the clamping member.

3. The connecting assembly for support frames of a bicycle saddle as claimed in claim 2, wherein the first assembling section is provided in its outer surface with an annular groove in which are formed the plurality of ribs, and the hook portion of the connecting member is restricted in the annular groove.

4. The connecting assembly for support frames of a bicycle saddle as claimed in claim 1 further comprising an end cap which is provided with an inner thread for engaging with an outer thread formed on the clamping section of the clamping member, so that the end cap is screwed on the clamping section of the clamping member to close the clamping slot.

5. The connecting assembly for support frames of a bicycle saddle as claimed in claim 1, wherein the hook notch of the hook portion of the hook member is curved.

6. A connecting assembly for support frames of a bicycle saddle being fixed to two support frames of a bicycle saddle and comprising:
   a clamping member including a first assembling section connected to a clamping section which is axially defined with a clamping slot for engaging with one of the support frames;
   a hook member including a second assembling section connected to a hook portion, the second assembling section being fixed to the first assembling section, the hook portion being radially provided with a hook notch for engaging with the other of the two support frames;
   a connecting member with a hook portion and a clamping portion, the hook portion being provided with a plurality of grooves for engaging with a plurality of ribs formed on an outer surface of the first assembling section of the clamping member, so as to fix the connecting member to the first assembling section of the clamping member.

7. The connecting assembly for support frames of a bicycle saddle as claimed in claim 6, wherein an inner thread is formed on an inner surface of the first assembling section, the second assembling section is provided with an outer thread for engaging with the inner thread of the first assembling section, so that the second assembling section is screwed in the first assembling section.

8. The connecting assembly for support frames of a bicycle saddle as claimed in claim 6 further comprising an end cap which is provided with an inner thread for engaging with an outer thread formed on the clamping section of the clamping member, so that the end cap is screwed on the clamping section of the clamping member to close the clamping slot.

9. The connecting assembly for support frames of a bicycle saddle as claimed in claim 6, wherein the hook notch of the hook portion of the hook member is curved.

10. The connecting assembly for support frames of a bicycle saddle as claimed in claim 6, wherein the first assembling section is provided in its outer surface with an annular groove in which are formed the plurality of ribs, and the hook portion of the connecting member is restricted in the annular groove.

* * * * *